(12) United States Patent
Yokoyama

(10) Patent No.: US 6,917,372 B1
(45) Date of Patent: Jul. 12, 2005

(54) METHOD AND SYSTEM OF CONTROLLING REPLACEMENT OF TERMINAL EQUIPMENT IN A BUILDING MANAGEMENT SYSTEM

(75) Inventor: Kozo Yokoyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/484,721

(22) Filed: Jan. 18, 2000

(30) Foreign Application Priority Data

Jan. 19, 1999 (JP) .............................. 11-10414

(51) Int. Cl.⁷ ............................................... G09G 5/00
(52) U.S. Cl. .................. 345/736; 345/771; 700/19; 700/286
(58) Field of Search .................. 364/550; 340/825.52, 340/286.01, 770, 735, 736; 345/718, 736, 771; 700/19, 286

(56) References Cited

U.S. PATENT DOCUMENTS

| | | | | |
|---|---|---|---|---|
| 5,103,391 A | * | 4/1992 | Barrett | 236/46 R |
| 5,279,458 A | * | 1/1994 | DeWolf et al. | 236/47 |
| 5,295,263 A | * | 3/1994 | Kojima et al. | 713/100 |
| 5,311,451 A | * | 5/1994 | Barrett | 364/550 |
| 5,435,147 A | * | 7/1995 | Mochizuki et al. | 236/51 |
| 5,680,113 A | * | 10/1997 | Allen et al. | 340/825.05 |

FOREIGN PATENT DOCUMENTS

| | | | | |
|---|---|---|---|---|
| JP | 4-160546 | * | 6/1992 | G06F/13/00 |
| JP | 7028633 | | 1/1995 | |
| JP | 10171634 | | 6/1998 | |

OTHER PUBLICATIONS

Bobek, John C., Jan. 1997, "Heating, Piping Air Conditioning", v69, n1, pS4(7), File 148.*

* cited by examiner

Primary Examiner—Tan Dean Nguyen
(74) Attorney, Agent, or Firm—Katten Muchin Zavis Rosenman

(57) ABSTRACT

A method for controlling replacement of plural terminal equipment in a building management system is disclosed, in which a system can be effectively replaced, without providing any temporal apparatuses and without any obstacle on the operation. The method for controlling replacement of plural terminal equipment connected to plural points to be managed in a building, includes the steps of tabulating a connecting status showing which existing terminal equipment or new terminal equipment is used in each point to be managed and correspondence between hard addresses of the existing terminal equipment and the new terminal equipment, which correspond to the points to be managed, and switching hard addresses corresponding to the points to be managed according to the tabled connecting status of the terminal equipment and the correspondence between the hard addresses of the existing terminal equipment and the new terminal equipment.

6 Claims, 15 Drawing Sheets

HMI address correspondence table T I

| P. ADR | H. ADR(OLD) | H. ADR(NEW) | STATUS |
|---|---|---|---|
| 0000000001 | 0101020101 | 0201020101 | NEW |
| 0000000002 | 0101020102 | 0201020102 | OLD |
| : | : | : | |

Expanding

PS(NA=01) Address correspondence table T II

| H. ADR | P. ADR | FLAG |
|---|---|---|
| 0101020101 | 0000000001 | Used |
| 0101020102 | 0000000002 | Not Used |
| : | : | |

PS(NA=02) Address correspondence table T III

| H. ADR | P. ADR | FLAG |
|---|---|---|
| 0201020101 | 0000000001 | Not Used |
| 0201020102 | 0000000002 | Used |
| : | : | |

|  | | NA | LA | RA | PA |
|---|---|---|---|---|---|
| ①Installed apparatus | Address When Connecting to Existing Terminal Equipment | 01 | 01 | 02 | 0101 |
| | Address When Connecting to New Terminal Equipment | 02 | 01 | 02 | 0101 |

NA=Processor No., LA=Interface No. in Processor, RA=Terminal Equipment No., PA=Destination No. of Connecting in Terminal Equipment No.

METHOD AND SYSTEM OF CONTROLLING REPLACEMENT OF TERMINAL EQUIPMENT IN A BUILDING MANAGEMENT SYSTEM

BACKGROUND OF THE INVENTION

1. Field of the Invention

The present invention relates to a method for controlling replacement of terminal equipment in a building management system.

2. Description of the Related Art

A building management system is used to monitor installed apparatuses localized in a building. There are cases where a few hundred to hundreds of thousand points to be monitored according to a scale of the building. For example, statuses and alarms of the installed apparatuses, analog measured values, such as temperature or humidity, and current values, and an integrated value of electric power meters are monitored.

Such the information as exampled above is connected to terminal equipment of the building management system through a relay connection (PIO) input and output, an analog input interface or a pulse input interface of a power board or a control board, which are locally provided.

In addition, the building management system is generally replaced after the elapse of 10 to 15 years from first installed. Therefore, at the replacement of the system, the old system should be reflected with a new system, of which structure is quite different from the old system because remarkable progressed technology has been developed up to the replacement.

In addition, structures of terminal equipment or a transmission method between a center device and each terminal equipment are also quite different from those of the old system in the building management system.

When a plurality of terminal equipment are replaced in the building management system, the replacement requires switching a few hundreds or hundreds of thousand external input and output points, which are connected to the plurality of terminal equipment while continuing the operation. Therefore, the system switching takes a long period from several weeks to several months.

From such the situation, it is required that the building management system should be replaced smoothly within a relatively shorter switching period, while the operations continue, without any trouble.

When a plurality of terminal equipment are replaced in the conventional building management system, the following methods and modes are used:

First method is that all of the center device and a plurality of terminal equipment, in the building management system, are simultaneously replaced, and Second method is that the center device and a plurality of terminal equipment are separately replaced.

In the second replacing method, only the center device is replaced to new one at first stage to connect the plural existing terminal equipment, and the plural existing terminal equipment are replaced to new equipment at the second stage.

In either of these replacing methods, it is the principle that the old building management system is switched to new one while the operation is continued. Then, the switching from old terminal equipment to new equipment takes a period from several weeks to several months, and the following switching modes are used for each method.

For the first method (Simultaneous replacing system);

As shown in FIG. 12, an existing system 10, which is still in a normal operation status, and a new system 20 is built up with a new center device 100A having a human-machine interface 202 and a processor 200, while executes application programs, such as a remote schedule program. The existing system 10, then, starts up the new system and confirms the operation thereof.

All of plural terminal equipment 201 belonging to the new system 20 are provided at the same time of providing the center device 100A of the new system 20 in advance. Alternatively, all external inputs and outputs of the existing terminal equipment 101 are switched to those of the new terminal equipment 201 while the existing terminal equipment 101 is serially switched and is replaced to the new terminal equipment 201.

When all of the new terminal equipment 201 are just switched, the existing system 10 is removed.

For the second method (separate replacing system);

First Stage: Replacing a Center Device

As shown in FIG. 13, a new center device 100A, which has a processor 200 and a human-machine interface 202, is installed. After the operation is confirmed, a destination of connecting a line of the existing terminal equipment 101 is switched from the center device 100 of the existing system 10 to the center device 100A of the new system 20. After the switching, the existing center device 100 of the existing system 10 is removed.

Second Stage: Replacing the Terminal Equipment

While the operation is executed in the center device of the new system 20, the existing terminal equipment 101 is replaced to the new terminal equipment 201.

In addition, in FIG. 13, the processor 200 is connected to the existing terminal equipment 101 through an interface 203.

As a first mode, as shown in FIG. 14, a temporal center device 100B is temporally provided for switching terminal equipment so as to connect the new terminal equipment. The existing terminal equipment 101 is subsequently switched to the new terminal equipment 201.

As a second mode, a processor 200A and an interface circuit 203A are provided in the new center device 100A of the new system 20, as shown in FIG. 15, data for new terminal equipment are installed in addition, and the existing terminal equipment 101 are subsequently switched to new terminal equipment 201.

As is apparent from the above-described explanation of FIG. 14, it is required to prepare two systems having the same scale at the same time, in the case of the separate replacing method of FIG. 14. However, the separate replacing system shown in FIG. 15 is preferable because there is no requirement to provide two same systems at the same time.

In an example shown in FIG. 14, although there is no need to perform duplicate data registration, the following problem will occur. In other words, two sets of center devices 100 and 100B should be prepared.

Further, the user should operate the two center devices 100 and 100A during the switching period according to the switching status, thus a problem occurs obstacle in using the both system.

On the other hand, although there is no need to prepare two center devices in the example shown in FIG. 15, duplicate data should be registered for both the existing terminal equipment 101 and the new terminal equipment 201.

In this case, points to be monitored and controlled or management points, which are input and output to the terminal equipment, are managed by addresses called as hard addresses, and these hard addresses must be different each for the existing terminal equipment and the new terminal equipment.

Therefore, it is required that point data must be prepared, of which attribute data, such as the name or type of the management point, is the same but only the addresses are different.

Further, since the point addresses are registered for display data or each functional data, duplicate data are prepared for the existing terminal equipments 101 and the new terminal equipment 201 in advance or the data registration should be changed according to the switching. Thus, the following problems occur:

One of the problems is that the data, such as point addresses or display data, should be registered in double, thus the capacity of memory requires double of the number of the points to be managed. Additionally, the data to be set, such as functional data, should be changed according to the switching of the terminal equipment, thus it takes much time to switch the system.

In addition, the double registered data should be properly used depending on the operation according to the switching status of the terminal equipment, thus the operation management is hindered during the switching period.

SUMMARY OF THE INVENTION

Accordingly, to overcome the above-described conventional problems, it is an object of the present invention to provide a method of controlling a replacement of terminal equipment in a building management system, in which a system can be effectively replaced, without providing any temporal apparatuses and without any obstacle on the operation.

In addition, it is another object of the present invention to provide a method of controlling a replacement of terminal equipment, by which the system can be effectively replaced, without preparing duplicated data for existing terminal and new terminal equipments, can effectively replace the system, without preparing duplicated data for existing terminal and new terminal equipments.

It is further object of the present invention to provide a method of controlling a replacement of terminal equipment in a building management system, in which operations can be accurately performed as the same as the previously used system without any obstacle on the operation because management point addresses are not changed.

The above-described objects can be achieved by method and system of controlling a replacement of terminal equipment in the building management system according to the present invention, connected to plural points to be managed in a building, including the step of tabulating a connecting status showing which existing terminal equipment or new terminal equipment is used in each point to be managed and correspondence between a hard address of the existing terminal equipment and the new terminal equipment.

The hard address corresponding to the points to be managed from the tabled connecting status of the terminal equipment and the correspondence between the hard addresses of the existing terminal equipment and the new terminal equipment.

In one preferred mode, the step of tabulating includes the steps of: tabulating connecting status of the terminal equipment to be managed in each terminal equipment, specifying which existing or new terminal equipment is used in each terminal equipment, and generating connecting status of the terminal equipment in each point to be managed according to the specification.

In the other mode of the present invention, the connecting status of the terminal equipment is expressed by a flag to be set when the connecting status is tabulated. Further, in other preferred mode, in the step of switching the hard addresses when the existing terminal equipment is switched to the new terminal equipment according to a judgement of the connecting status of the terminal equipment when switching the hard address corresponding to the points to be managed, the point to be managed is only monitored and controlled, of which mode is changed to a TEST mode where the point can not be monitored and controlled by application processes. Furthermore, in the other preferred mode, the TEST mode is transited to a normal operation mode by a manual operation.

Further, other objects of the present invention will become clear by the description for explaining embodiments according to the attached drawings.

BRIEF DESCRIPTION OF THE PRESENT INVENTION

Figure 15:
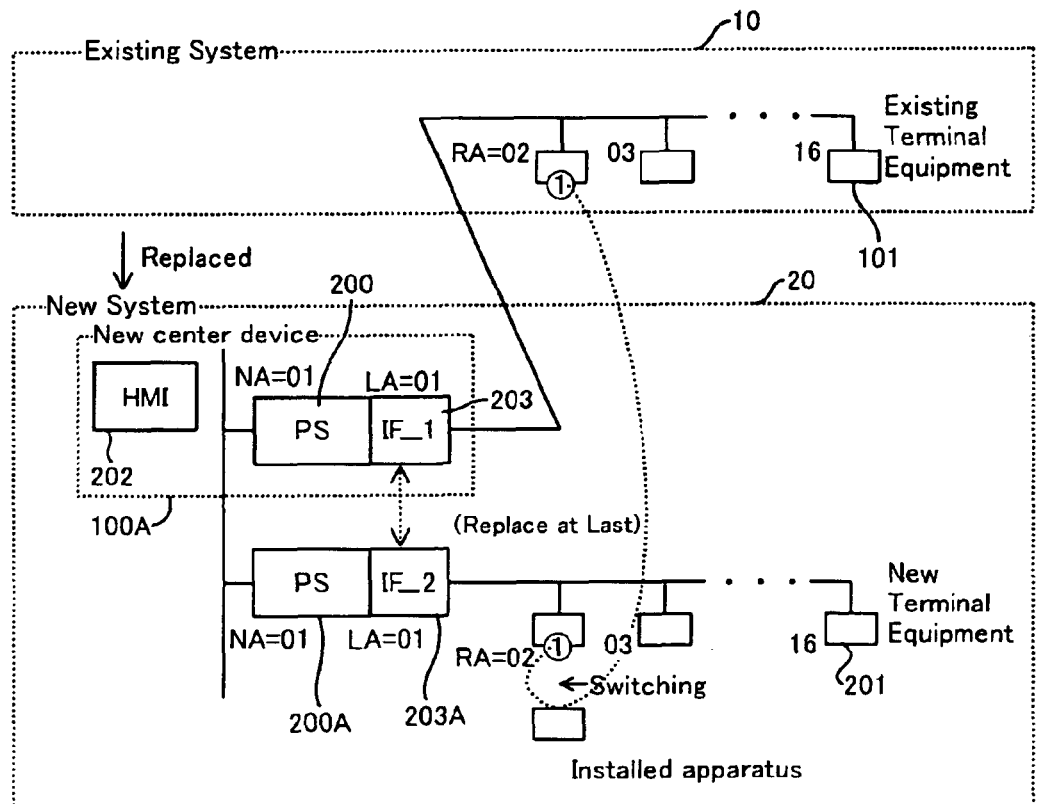

FIG. 15 further shows the other mode of the conventional second method.

Figure 1:
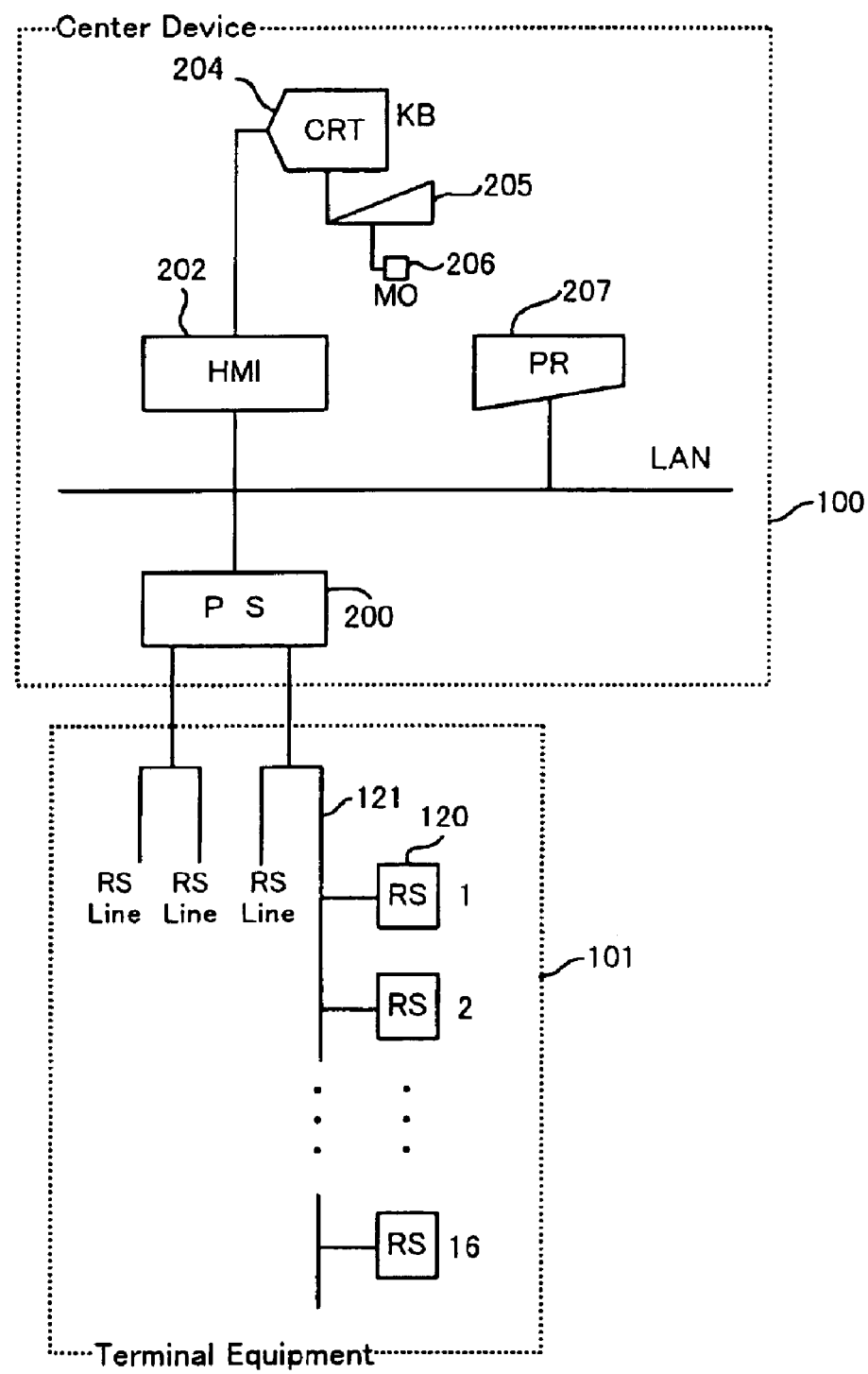
FIG. 1 is a diagram for explaining system and hardware structures to realize a method of controlling a replacement of terminal equipments in the building management system according to the present invention.
Figure 16:
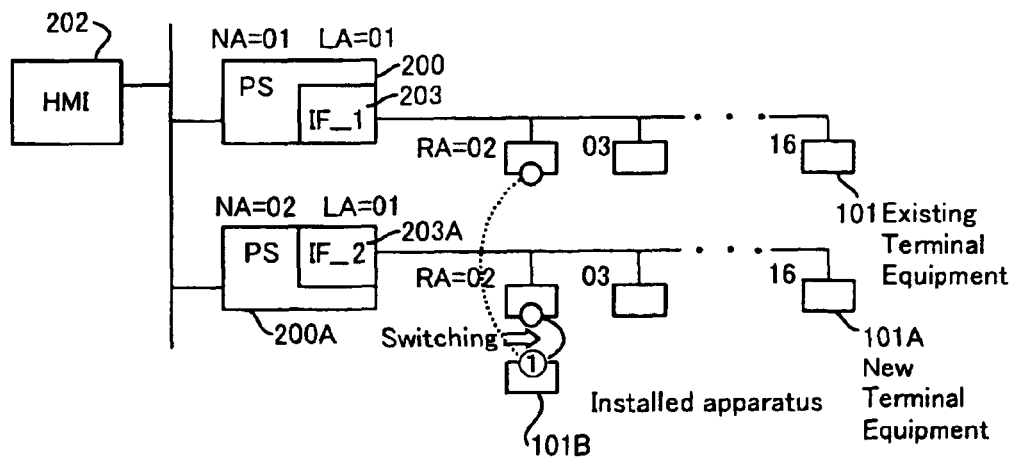

FIG. 16 shows an embodiment of the building management system by the use of the conventional technique in contrast to the diagram of FIG. 1.

Figures 17A, 17B:
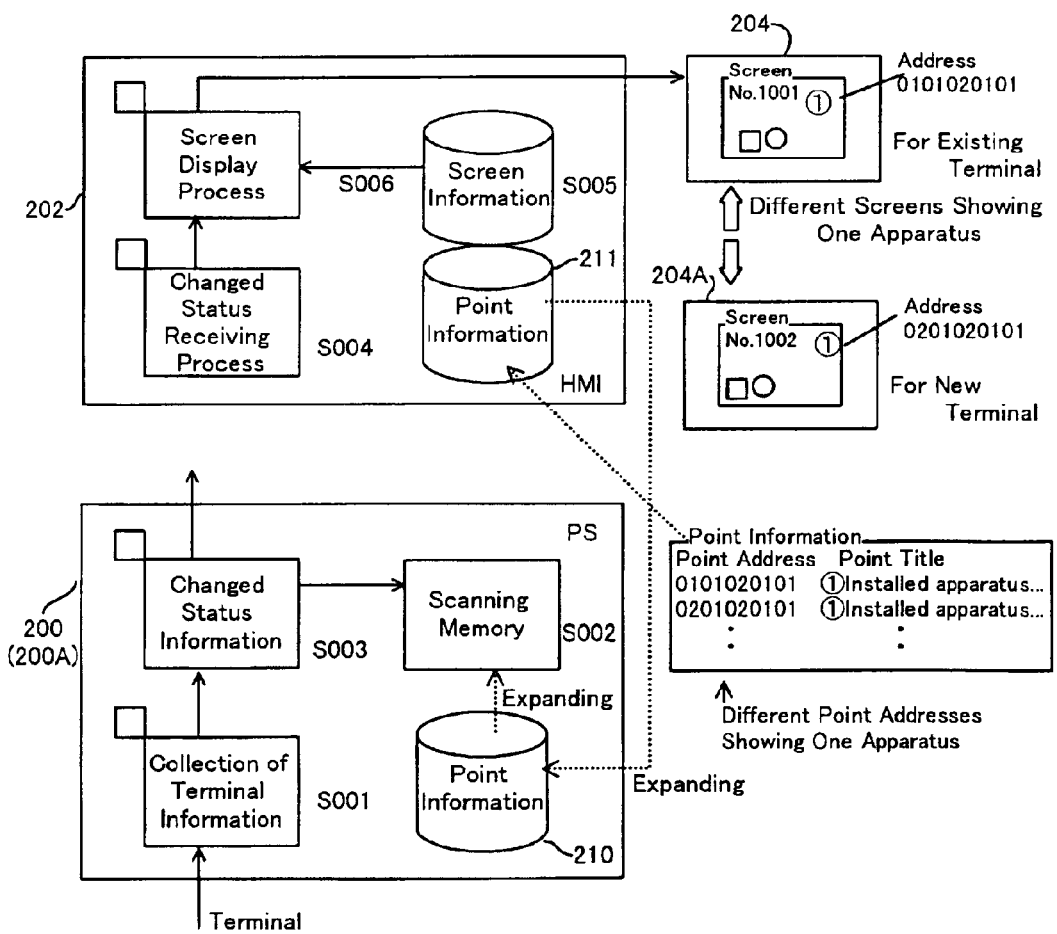

FIGS. 17A and 17B are explanatory diagrams of a detailed example of FIG. 16.

Figure 18:
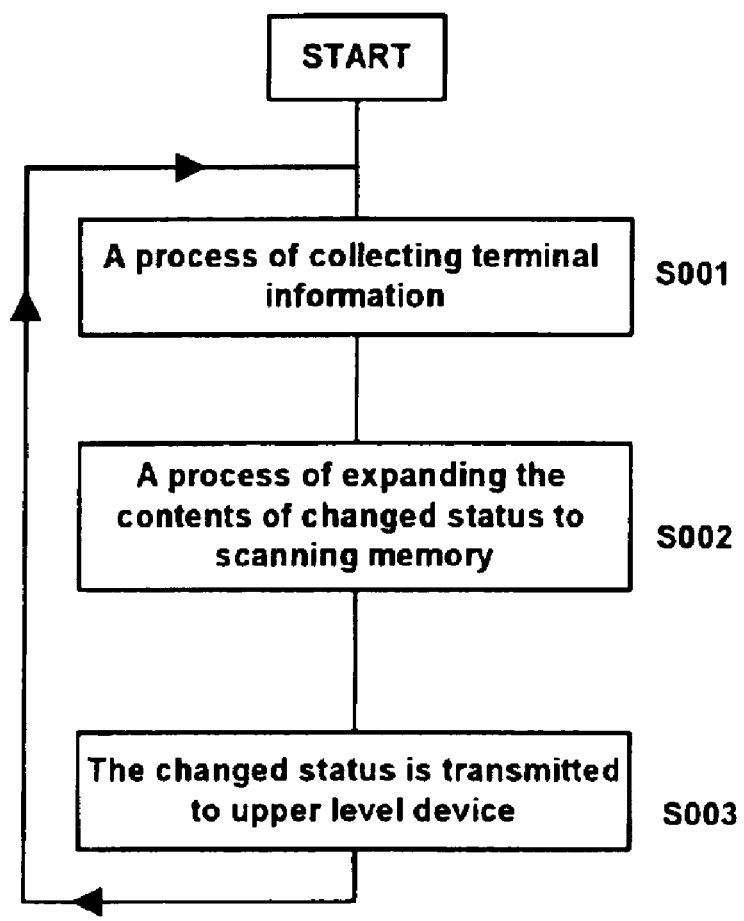

FIG. 18 is an operational flow chart of a processor (PS) 200 (200A) corresponding to the operational explanatory diagram shown in FIG. 17B.

DESCRIPTION OF THE PREFERRED EMBODIMENTS

Hereinafter, embodiments of the present invention will be now described in reference to the drawings. Throughout the attached drawings, the same reference numerals and symbols are used to denote and identify corresponding or identical components.

FIG. 1 is an explanatory diagram of system and hardware structures to realize a method of controlling a replacement of terminal equipment in a building management system according to the present invention.

In FIG. 1, a center device 100 has a human-machine interface (HMI) 202, connected to a LAN, graphically displays statuses of the apparatuses to be monitored, on a CRT display device 204, and controls with an operator and a human-machine interface.

A keyboard 205 and a mouse 206 for operating the HMI 202 are connected to the HMI 202. These devices are used to collect information of the terminal equipment 101 from a processor 200 and execute each function by using the information.

A printer 207 is further connected to the LAN that prints a continuous formed table where a message showing the statuses of the apparatuses to be monitored are changed and a measured value are tabulated in a dairy form or a hard copy of the screen displayed on the CRT display device 204 of the HMI 202.

The terminal equipment 101 has plural remote stations (RS) 120, takes an interface with apparatuses to be monitored to connect them, and inputs from and outputs the information to the apparatuses. Further, the terminal equipment 101 transmits to and receives the information from an upper level processor (PS) 200.

In here, the practical situation of the conventional method of controlling will be further explained for better understanding of the present invention. FIG. 16 shows an example of the conventional building management system, in contrast to FIG. 1.

When the plural terminal equipment are replaced in the structure of FIG. 16, the processors (PS) 200 and 200A for the existing and new terminal equipment 101 and 101A are serially driven as described above.

An input or output line from an installed apparatus 101B connected to the terminal equipment 101 is re-wired from the existing terminal equipment 101 to the new terminal equipment 101A to switch the system.

In this case, the processors (PS) 200, 200A and the human-machine interface (HMI) 202 recognize a connecting point of the existing terminal equipment 101 and a connecting point of the new terminal equipment 101A with respective different addresses.

In other words, in the above-described example, the installed apparatus ① 101B takes a different address between the case where the installed apparatus 101B is connected to the existing terminal equipment 101 and the case where the installed apparatus 101B is connected to the new terminal equipment 101A, as shown in FIG. 17A.

In FIG. 17A, NA means a processor number, LA means an interface number, RA means a terminal equipment number, and PA means a destination number in the terminal equipment. When connecting to the existing terminal equipment 101, the address of the installed apparatus ① 101B becomes "0101020101", because NA is "01", LA is "01", RA is "02" and PA is "0101", for example.

On the other hand, the address of the installed apparatus 101B is changed to "0201020101" when connecting to the new terminal equipment 101A, because only NA is changed to 02.

Therefore, when the installed apparatus ① 101B is displayed on the screen of the CRT display device 204 of the HMI 202, for example, it is required to prepare two screens for the existing and new terminal equipments 101 and 101A.

FIG. 17B shows an example where the status change, of the installed apparatus 101B linked to the terminal equipments 101 and 101A, obtained from the processor (PS) 200 is displayed on two of the different screens 204 and 204A by the HMI 202.

FIG. 18 is an operational flow chart of the processor (PS) 200 (200A) corresponding to the operational explanatory diagram shown in FIG. 17B. The processors 200 and 200A collect terminal information from the terminal equipment 101 and 101A (STEP S001). The processors 200 and 200A scan a point information database 210 (STEP S002), and inform the present situation to the HMI 202, which is an upper level device, that the status of the installed apparatus having the detected point address is changed (STEP S003).

In addition, the HMI 202 informs the information that the status is changed received from the processors 200 and 200A, as shown in FIG. 17B (STEP S004), and reads out the data of the point information from the point information database 211 (STEP S005). Different information for the same installed apparatus is registered as the point information.

Next, the screen displaying process is performed (STEP S006), and the information is displayed on the two screens 204 and 204A respectively for the existing and new terminal equipment.

Although controlling and monitoring functions, such as a schedule starting or stopping control function, are realized in the HMI 202 and the processor 200 of the building management system, the points to be managed are registered according to the address. Therefore, in the conventional system of FIG. 16, it is required to register two process data or to change the registered addresses for the same installed apparatus, similarly to the case of the displayed screen.

Figure 2:
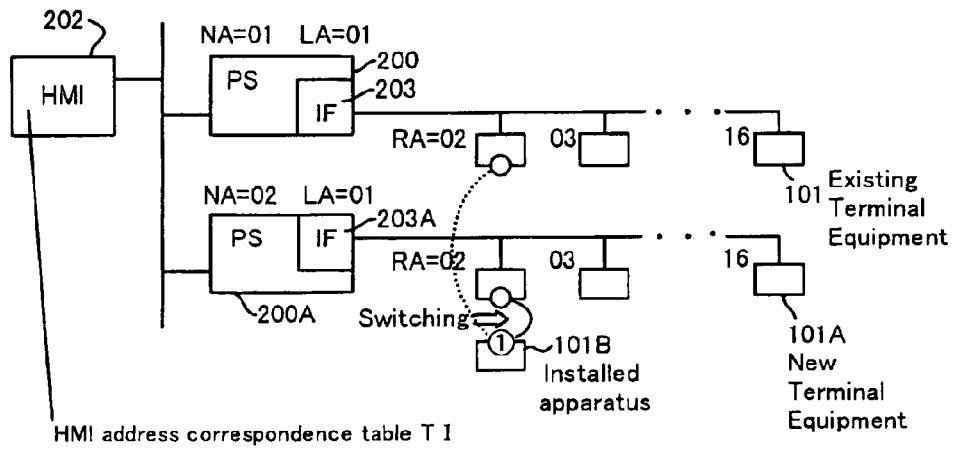
FIG. 2 is an explanatory diagram of a first embodiment of the present invention.

On the contrary, the method according to the present invention can prevent from generating the above-described problems. FIG. 2 is an explanatory diagram of the first embodiment according to the present invention where a HMI address correspondence table TI, a hard address correspondence table TII of the existing terminal equipment, and a hard address correspondence table TIII of the new terminal equipment are included, each of which are maintained in the HMI 202.

The correspondence table TI indicates the hard address (H. ADR (OLD)) of the existing terminal equipment corresponding to each address (P. ADR) of the management point, the hard address (H. ADR (NEW)) of the new terminal equipment, and the connection status (STATUS) of the terminal equipment that shows which existing or new terminal equipment is used.

The hard addresses are automatically selected according to the status of connection from correspondence in the table TI, and the selected hard addresses are expanded on the processor (PS) address correspondence tables TII and TIII, by specifying the connecting status from the HMI 202.

The correspondence table TII shows correspondence between the hard address (H.ADR) and the management point (P.ADR) of the existing terminal equipment and a flag (FLG) showing whether or not the management point is used. The table TIII shows the correspondence between the hard address (H. ADR) of the new terminal equipment and the management point (P. ADR) and a flag (FLAG) that shows whether or not the management point is used.

Figure 3:
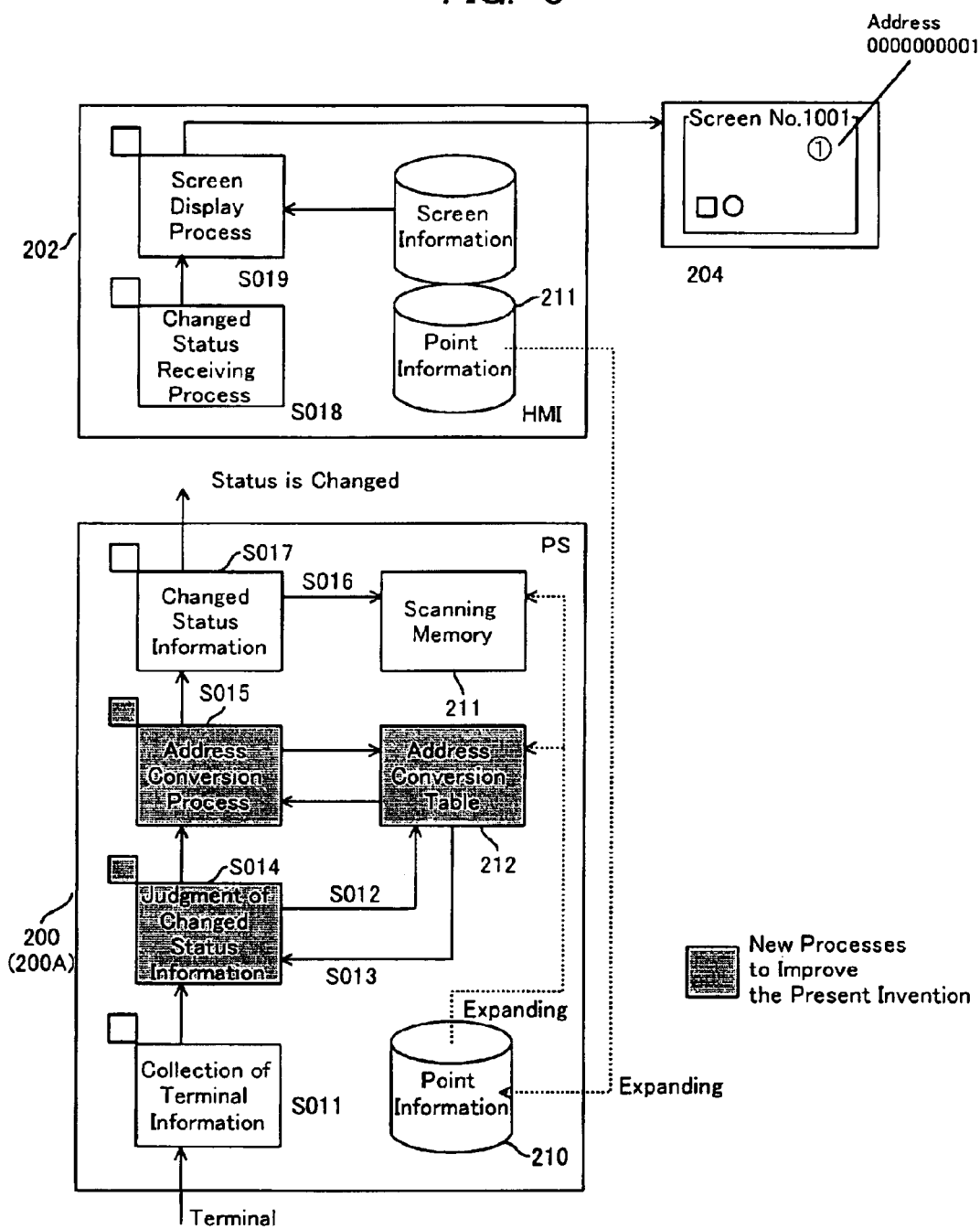
FIG. 3 is a diagram of explaining one example of processes by the use of a processor according to the present invention when the status is changed.

FIG. 3 is an explanatory diagram showing one example of processes performed by the processors (PS) 200 and 200A and the HMI 202 when the status is changed.

The HMI 202 maintains the address correspondence table TI shown in FIG. 2. The address correspondence table TI shows point information including hard addresses for the existing and new terminal equipments, addresses of management points to be managed, and an indication showing the management points are connected to either the existing or new terminal equipment.

The table TI is expanded to the correspondence tables TII and TIII for each hard address in each processor (PS) 200 and 200A, and is down loaded to each processor on an initial process.

The processor (PS) 200 (200A) holds the address correspondence table TII (TIII), which is downloaded from the HMI 202 as point information. The point information is expanded to a scanning memory 211, which stores the current status in each point and an address conversion table 212 on the initial process.

The address conversion table 212 is formed as described above, and is composed of a hard address, a point address corresponding to the hard address, and a flag (FLAG) showing whether the hard address is valid or not.

The FLAG has a configuration as reflected by change of the status (STATUS) showing whether the existing terminal equipment 101 or the new terminal equipment 101A is available in the HMI 202.

Figure 4:
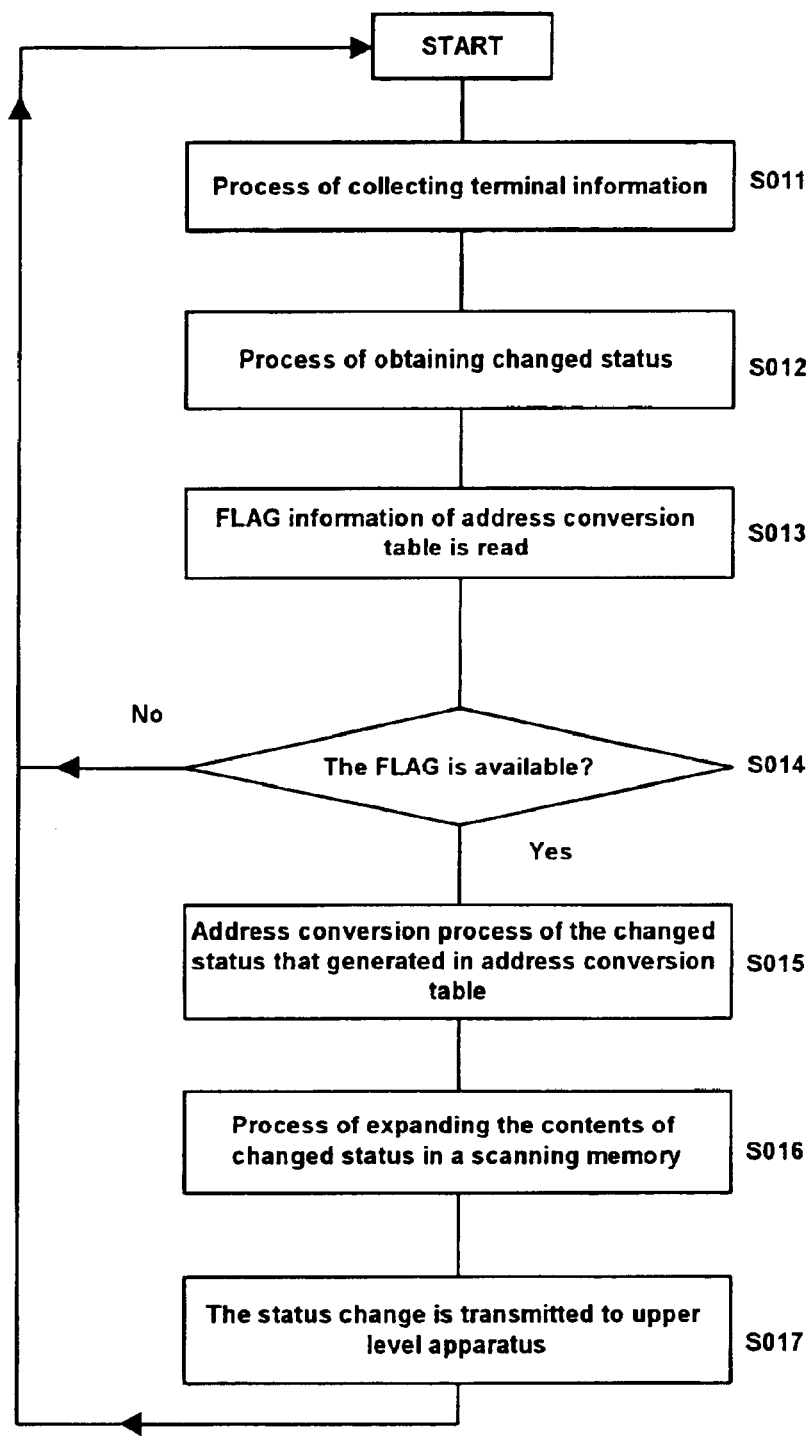
FIG. 4 is an operational flow chart of the processor of the process explanatory diagram shown in FIG. 3.

FIG. 4 is an operational flow chart of the processor (PS) 200, 200A shown in the process explanatory diagram of FIG. 3.

When it is informed from the terminal equipment 101 that the status is changed, the processor (PS) 200 collects the terminal information (STEP S011). The processor 200 obtains the changed status from the terminal information (STEP S012). Next, the processor 200 reads the FLAG information of the address conversion table 212 (STEP S013). Then, the processor 200 judges whether or not the FLAG information is valid (STEP S014).

If the FLAG information is valid, the address corresponding to the generated status change is converted according to the address conversion table 212. (STEP S015). Then, the contents of the status changed are expanded to the scanning memory 211 (STEP S016), and the changed status is informed to the HMI 202, which is an upper level device (STEP S017).

As shown in FIG. 3, the HMI 202 receives the information of the changed status (STEP S018), performs a screen displaying process of the status changed in the point corresponding to the hard address to be managed (STEP S019), and displays that on the CRT display device 204.

Advantages in the embodiment are:

First is that there is no need to prepare a HMI for switching when switching from the existing terminal equipment to the new terminal equipment, and there is further no need to use plural HMIs properly during the switching period; and Second is that there is no need to have two sets of management point data for the existing and new terminal equipment. Those advantages bring merits as follows:

First is that there is no need to have capacity of the twice capacity of the point to be managed.

Second is that there is no need to register and change the address, which is registered as the display data and the functional data, because the point address is not changed, even if the management point is switched from the existing terminal equipment to the new terminal equipment.

Figure 5:
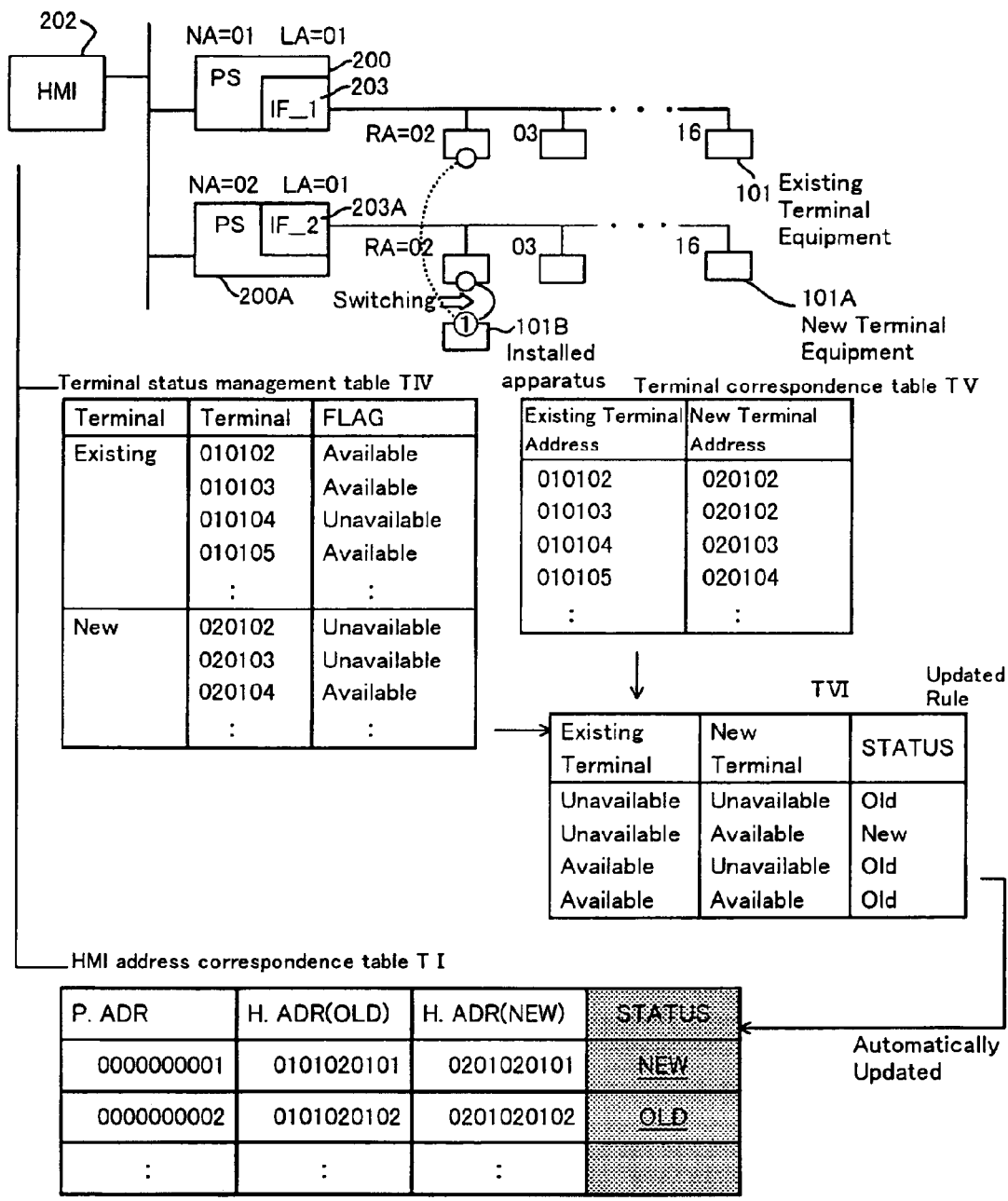
FIG. 5 shows a second embodiment according to the present invention.
Figure 6:
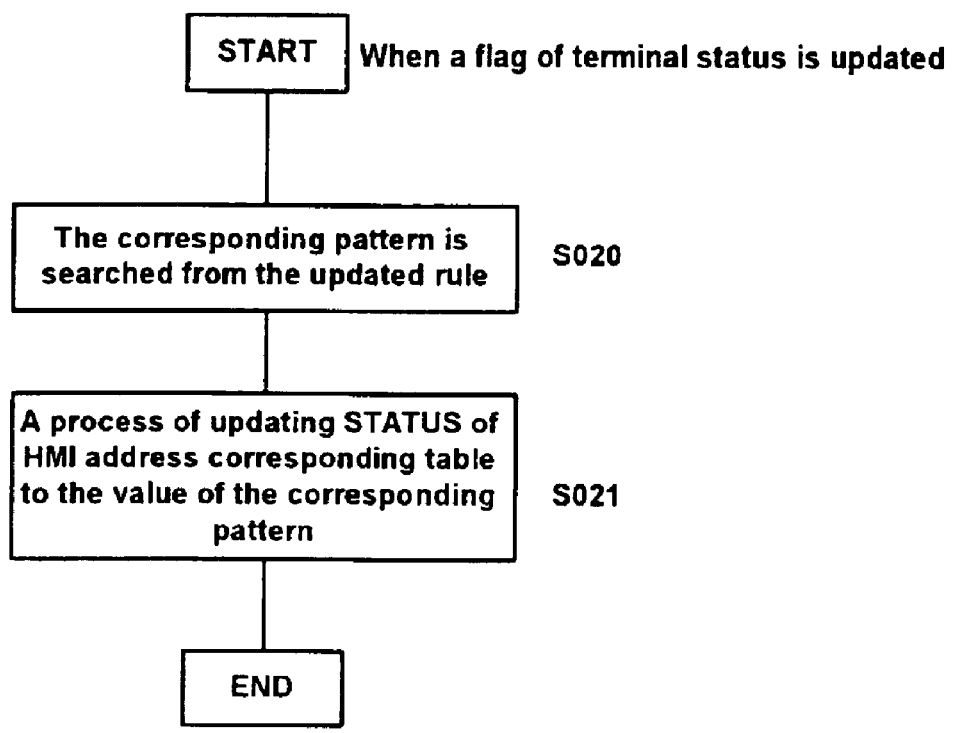
FIG. 6 is an operational flow chart corresponding to FIG. 5.

FIG. 5 shows the second embodiment according to the present invention. A terminal status management table TIV and a terminal correspondence table TV are provided to the HMI 202. The table TIV includes distinguishes between the existing and new terminal equipment, the corresponding terminal address and the FLAG information showing whether or not the terminal equipment is available.

The terminal correspondence table TV includes information of the correspondence between addresses of the existing and new terminal equipment. The terminal status management table TIV specifies available or unavailable for each existing and new terminal equipment by the FLAG.

In here, new terminal equipment has a different structure from the existing terminal equipment, and therefore, the terminal number RA is not always corresponding by identical between the existing and new terminal equipment. Accordingly, it is determined by the updated rule table TVI set in advance, which terminal number RA is made available when both FLAGs are valid or invalid for the existing terminal equipment and the new terminal equipment.

In other words, updated rule in the updated rule table TVI are searched with reference to the terminal status management table TIV and the terminal correspondence table TV (STEP S020), and the status of the HMI address correspondence table TI of the management point corresponding to the terminal equipment is automatically updated (STEP S021).

In this way, the information is expanded to the existing processor (PS) address correspondence table TII and the new processor (PS) address correspondence table TIII according to the updated HMI address correspondence table TI, and then, the processes after that are performed, similarly to those of the first embodiment shown in FIGS. 2 to 4.

Figure 7:
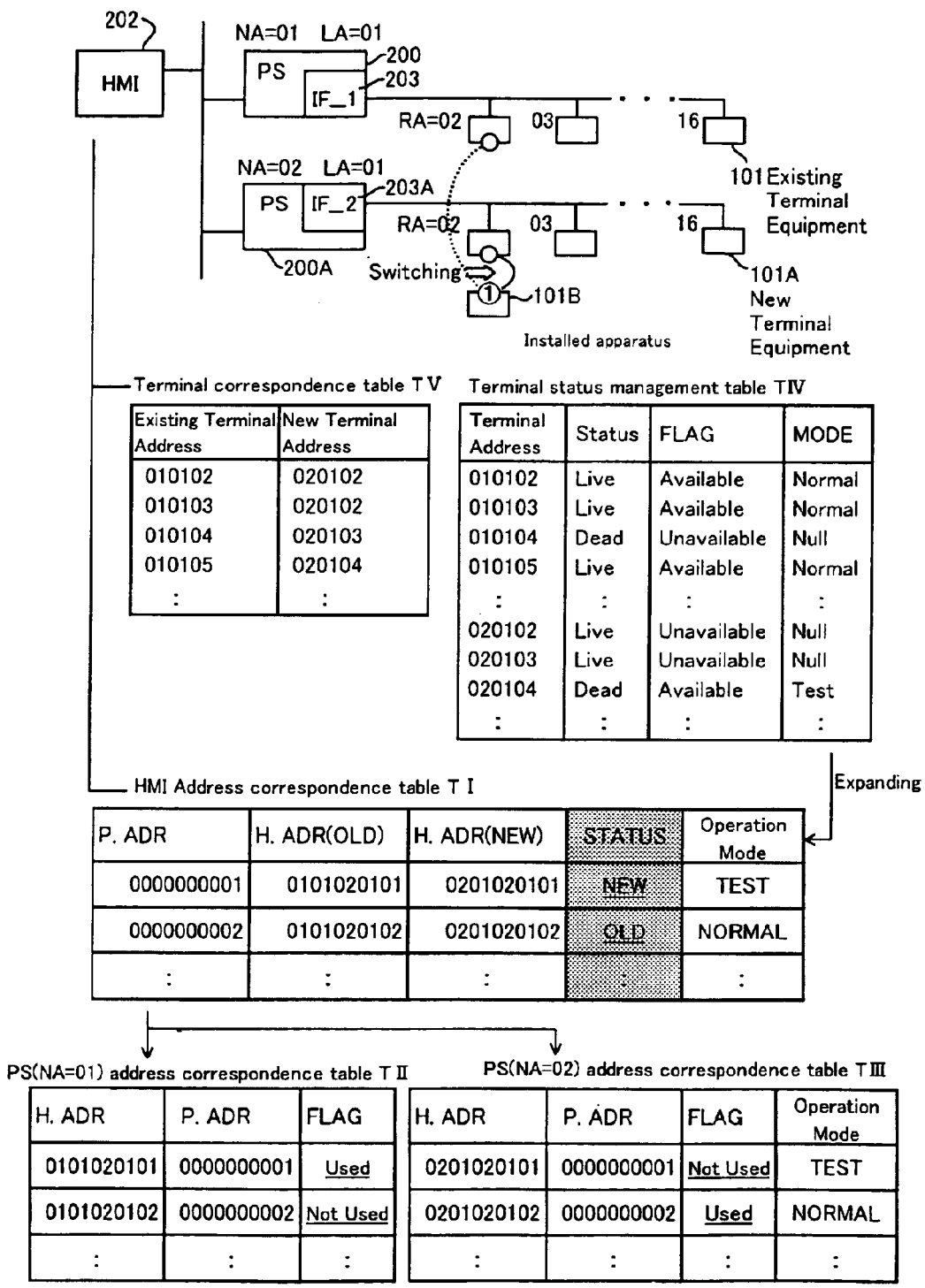
FIG. 7 shows a third embodiment according to the present invention.

FIG. 7 shows the third embodiment according to the present invention. In the third embodiment, the processor (PS) 200, which manages the point to be managed or the address conversion device in the fourth embodiment, which is described later, judges which the existing terminal equipment 101 or the new terminal equipment 101A is used. The hard address corresponding to the point to be managed is automatically switched according to the status.

Figure 8:
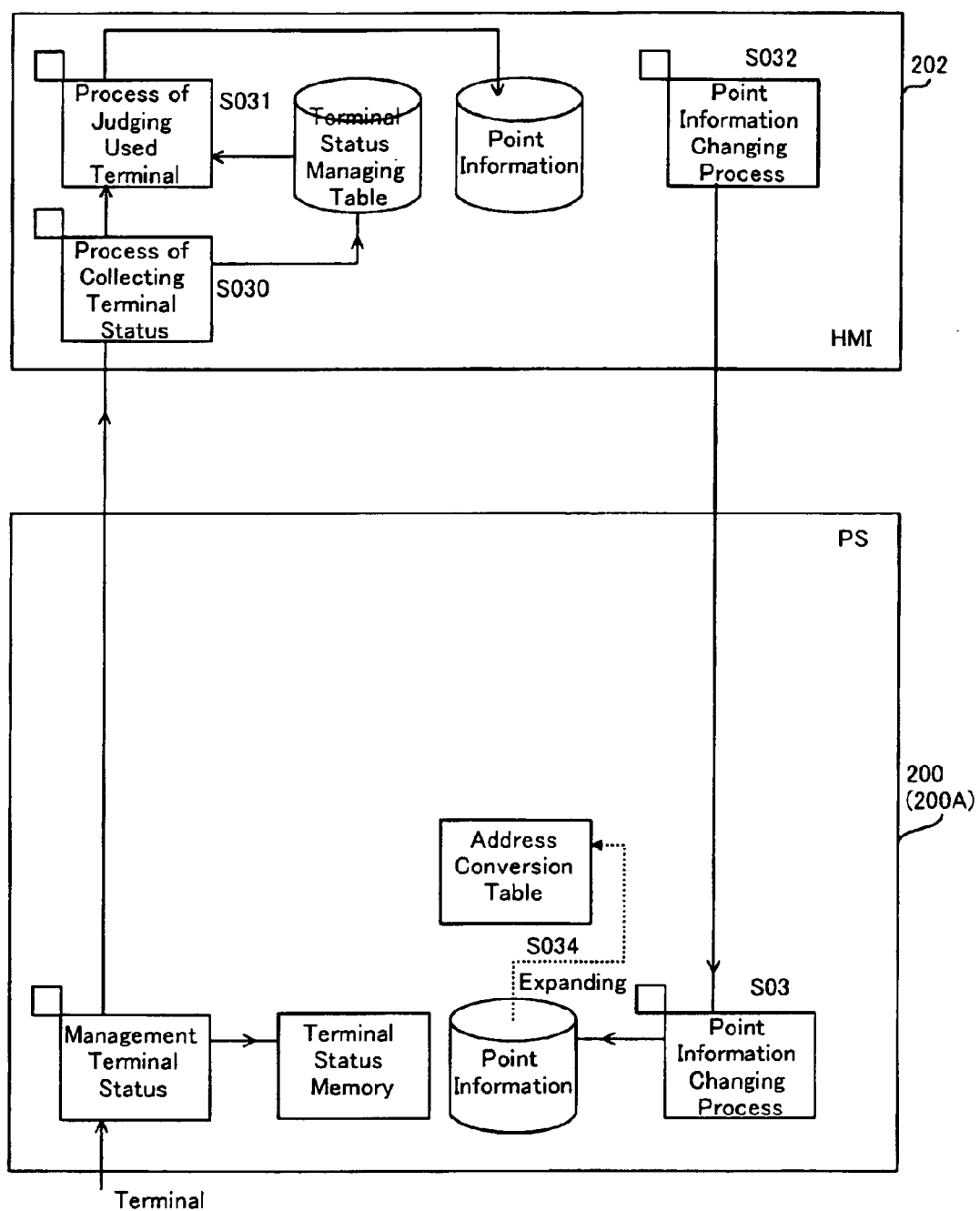
FIG. 8 shows a relationship between HMI and the processor to explain the third embodiment.
Figure 9:
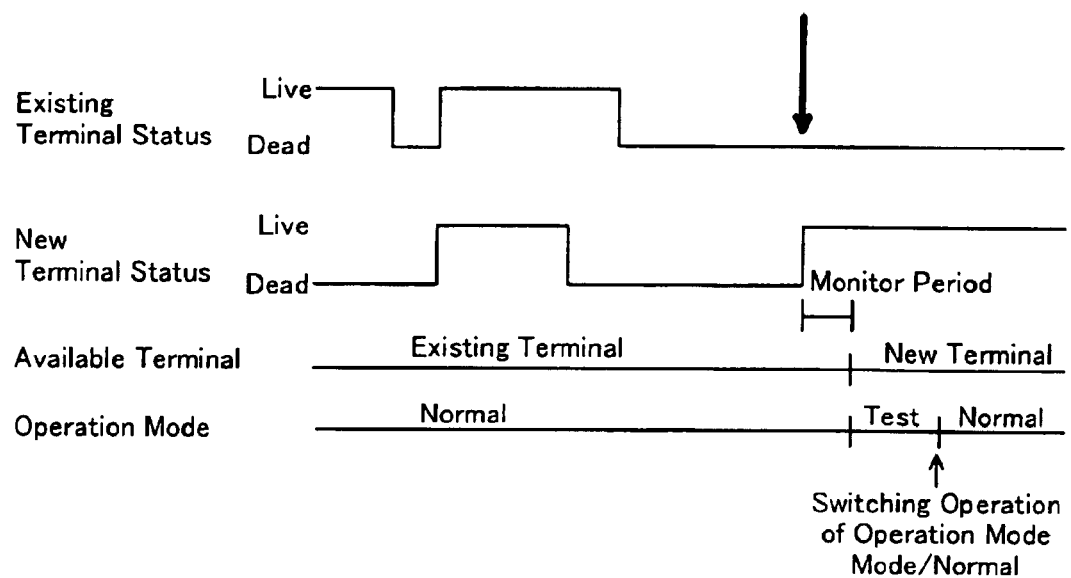
FIG. 9 is one example showing a state diagram of the existing and new terminal equipments.
Figure 10:
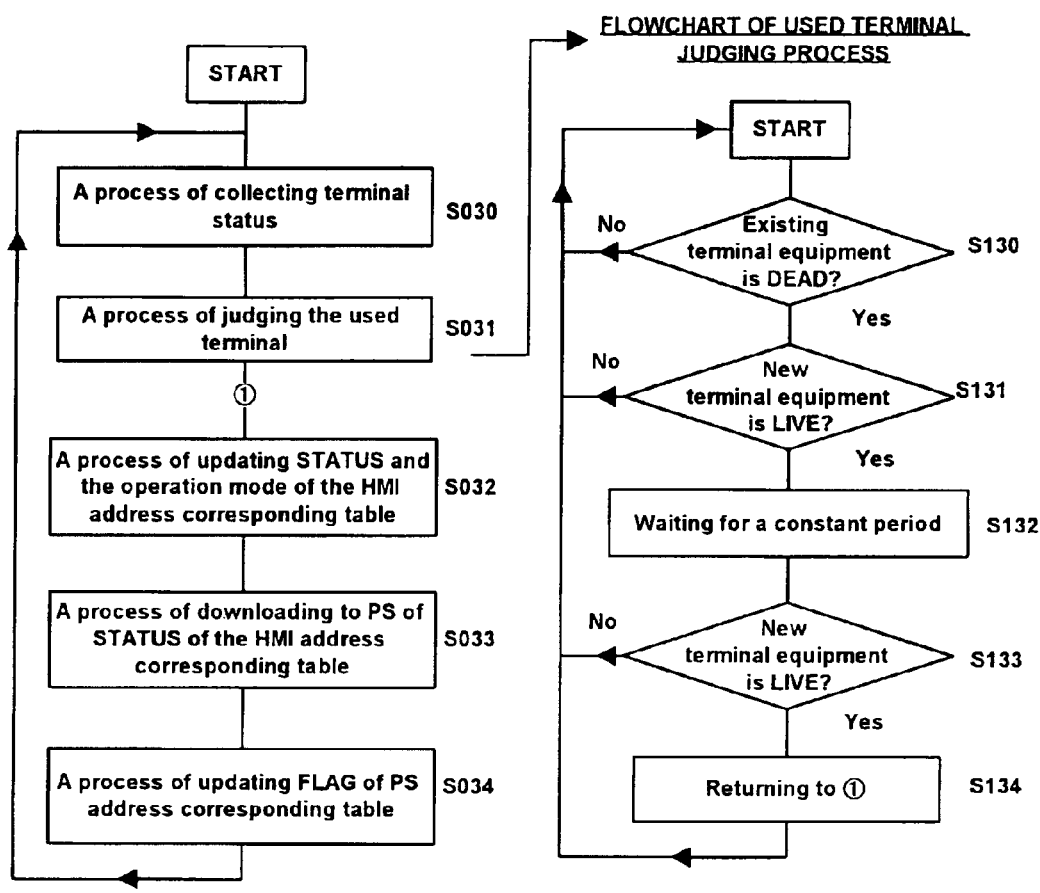
FIG. 10 is an operational flow chart corresponding to FIG. 9.

FIG. 8 shows relationship between the HMI 202 and the processor (PS) 200 (200A) for explaining the operation of the third embodiment. Further, FIG. 9 is a diagram showing a diagram status transition of the existing and new terminal equipment. FIG. 10 is an operational flow chart corresponding to FIG. 9.

The HMI 202 has a terminal correspondence table TV, similarly to those of the first and second embodiments, and the table TV defines the correspondence between addresses of the existing and new terminal equipment.

The HMI 202 further includes a terminal status management table TIV, to which the terminal status informed from the processor (PS) 202 is reflected.

The terminal status management table TIV in the example of FIG. 7 includes an indication of the terminal status corresponding to the terminal address that shows LIVE or DEAD status, a flag FLAG showing valid or not, and an operational MODE indication showing NORMAL or TEST mode on the valid FLAG and NULL on the invalid FLAG.

The terminal status management table TIV in which the terminal status is reflected and the terminal correspondence table TV are searched in each predetermined period according to the used terminal judging process by the HMI 202.

In other words, the HMI 202 receives the information sent from the processor 200 (220A) and collects the terminal status (STEPP S030) in the operational flow chart shown in FIG. 10. Then, the used terminal judging process is performed by the HMI 202 (STEP S031).

In FIG. 10, it is judged whether the existing terminal is in a DEAD status or not during the used terminal judging process (STEP 5031). When the existing terminal equipment is in the DEAD status, it is judged whether or not the new terminal equipment is in a LIVE status (STEP S131).

The status that new terminal equipment is in the LIVE status on the step S131 corresponds to a broken line of FIG. 9. In this case, the HMI 202 waits for a certain period as a monitor time (STEP S132).

After the monitor period is elapsed, it is judged whether or not the new terminal equipment is in the LIVE status (STEP S133). If it is judged the new terminal equipment is in the LIVE status, the used terminal judging process (STEP S031) is finished, and then, updating process of the status of the HMI address table TI (STATUS) and the operating mode is performed (STEP S032).

The STATUS flag of the management point of the relevant terminal equipment of the address correspondence table TI is updated according to the updating process of the step 5032. In addition, the updated STATUS flag of the HMI address correspondence table TI is downloaded to the processor 200 (200A) (STEP S033).

Then, the processor 200 (or 200A) expands the processor address correspondence tables TII and TIII according to the tables TI and TII for HMI address, and then, the flag FLAG is updated in each processor (PS) address correspondence table (STEP S034).

The available terminal equipment is switched to the new terminal equipment according to the FLAG updating process on the table for the processor (PS) address. Since an opeation test is required before the operation after switching of the terminal equipment, the operation mode is included, as shown in FIG. 9, which is changed to a TEST mode where the point can be monitored and controlled after the switching, but monitoring and controlling by the application process can not be possible. After an elapse of the TEST mode, the mode is switched to the NORMAL mode, and then, the new terminal equipment becomes actually operable.

The operation mode of the terminal, of which status on the HMI address correspondence table TI of FIG. 7 is "NEW", is set to the TEST mode, for example. The transition from the TEST mode to a NORMAL mode that means a normal operational mode can be performed by a manual operation.

The third embodiment brings a merit as follows:

It is possible to automatically transit to a test mode without any instruction of switching in each point after the existing terminal equipment is switched to the new terminal equipment, and it is also possible to transit from the test mode in total, thus it becomes possible to reduce times of transiting to the operation after the terminal equipment is switched and replacing the system.

Figure 11:
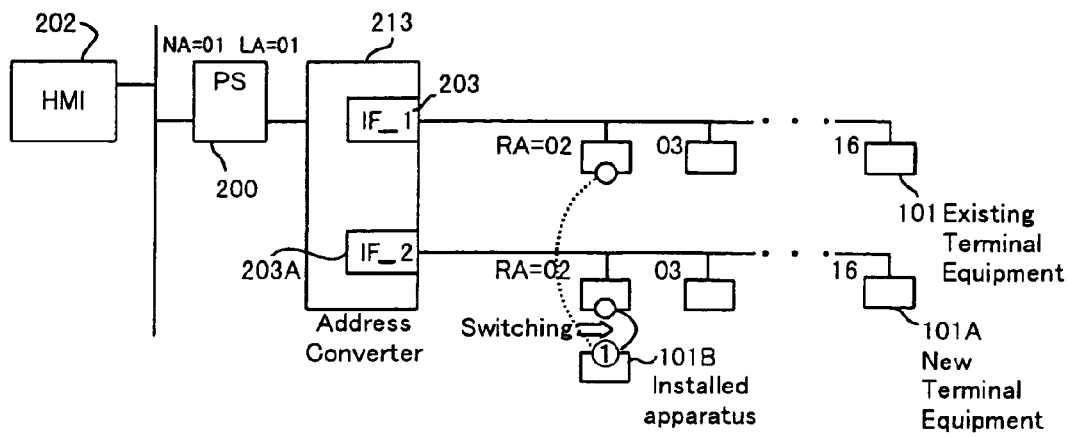
FIG. 11 is a diagram showing a fourth embodiment according to the present invention, which is a system structural diagram to improve the operation of the above-described embodiments by an address converter 213.
Figure 12:
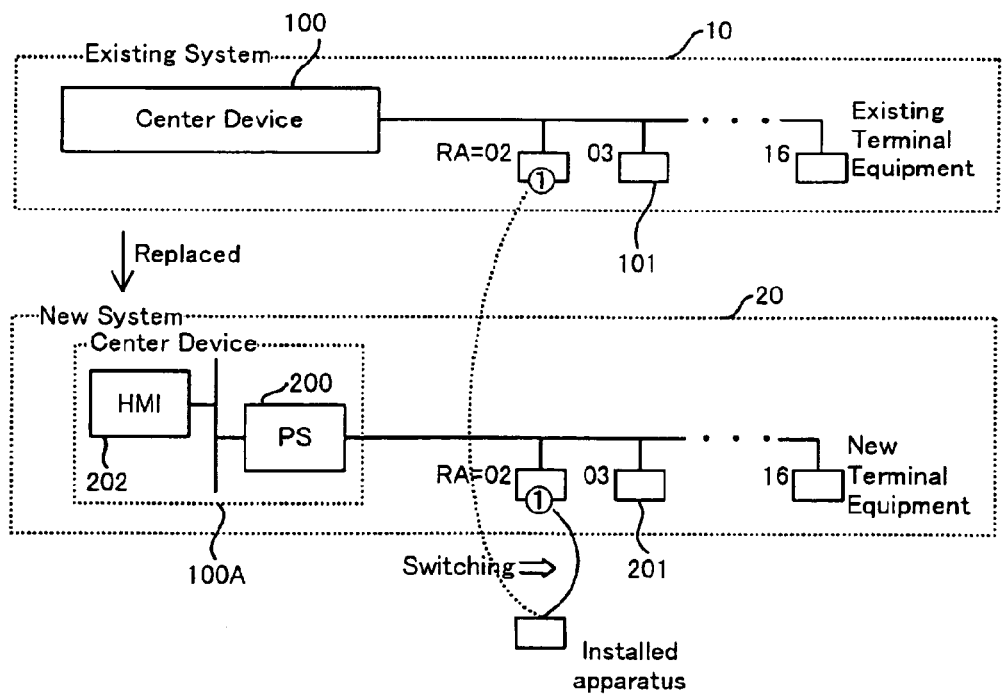
FIG. 12 is an explanatory diagram of the conventional first method.
Figure 13:
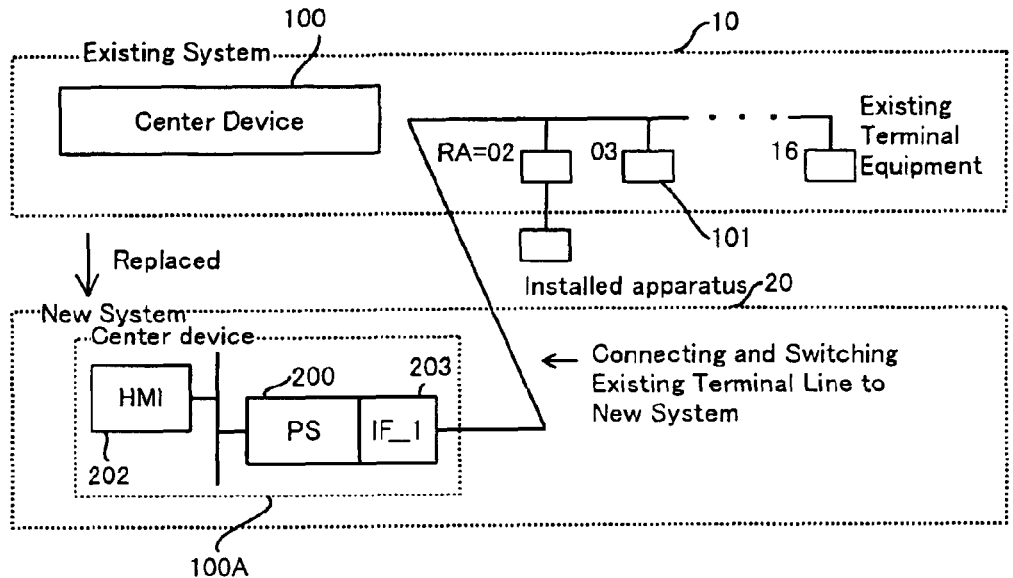
FIG. 13 is an explanatory diagram of the conventional second method.
Figure 14:
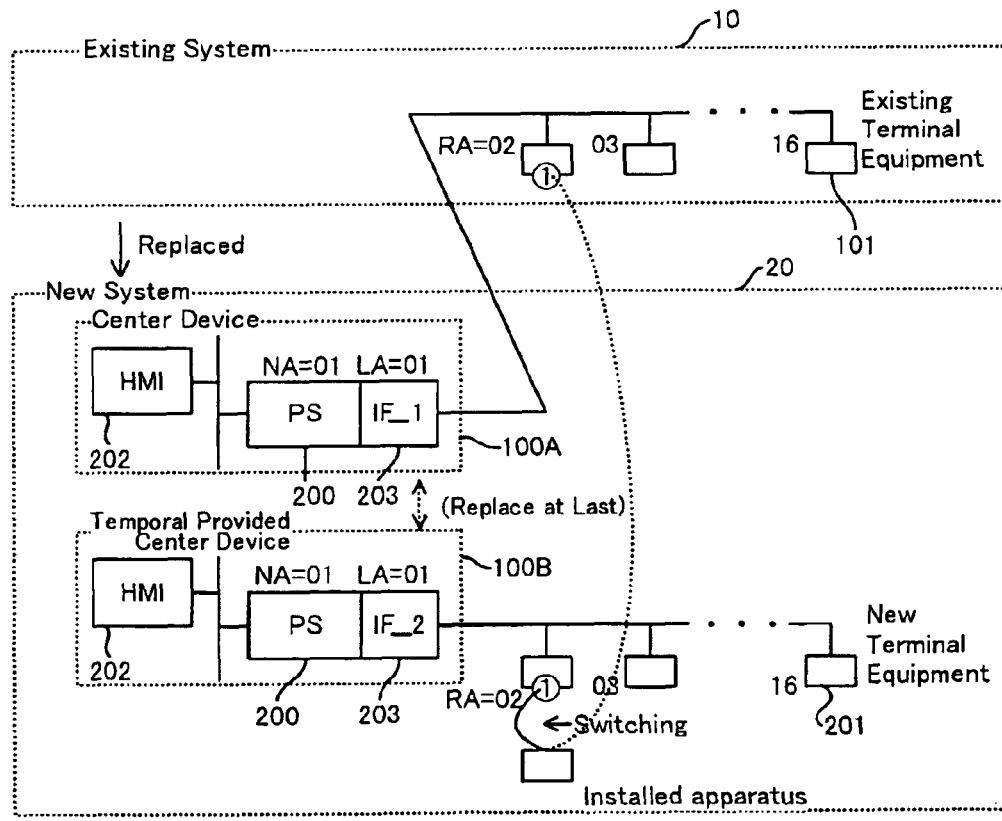
FIG. 14 shows the other mode of the conventional second method.

FIG. 11 shows a structural diagram of a fourth embodiment according to the present invention, and the embodiment realizes each operation of the above-described embodiments by an address conversion device 213.

In other words, the address conversion device 213 is formed with an address conversion function of the existing processor 200 commonly for the existing and new terminal equipments 101 and 101A, instead of providing a new processor 200A.

Therefore, interface circuits 203 and 203A corresponding to the existing and new terminal equipment 101 and 101A are provided to one address conversion device 213 in FIG. 11. Other structure and operation are the same as those of the first to third embodiments, which are described above.

As is explained according to the attached drawings, there is no need to prepare two systems, there is also no need to operate in two systems during a switching period, and it becomes possible to effectively replace without temporally providing apparatuses and without interfering with the operation.

Additionally, since there is no need to prepare data for existing and new terminal equipments in double, effective replacement can be performed. Further, it becomes possible to accurately operate a new system without changing before switching the system because the management point address is not changed, without any interference on the operation.

The invention may be embodied in other specific forms without departing from the sprit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for controlling replacement of terminal equipment in a building management system, in which a human-machine interface and a processor are connected via a LAN, and a plurality of terminal equipment each having a management point within a building are connected to the processor, said method comprising the steps of:

providing a new processor;

connecting new terminal equipment to the new processor as the old terminal equipment is replaced;

providing in the human-machine interface a first table having information of hardward addresses of the old terminal equipment and the new terminal equipment, management points and statuses indicating whether the management points are connected to the old terminal equipment or the new terminal equipment;

spreading out at an initial time the first table to a second table having information of correspondences between the hardware addresses of the old terminal equipment and a plurality of management points and flags indicating whether each of the old terminal equipment being used or not, and a third table having information of correspondences between the hardware addresses of the new terminal equipment and the plurality of management points and flags indicating whether each of the new terminal equipment being used or not;

downloading the second and third tables as management point information in the old terminal equipment and the new terminal equipment, respectively;

informing the human-machine interface of status changes at management points according to the management point information downloaded in the old terminal equipment and the new terminal equipment; and in the human-machine interface, receiving the status changes and displaying a status change at a concerned hardware address so as to monitor the replacement of terminal equipment of the concerned hardware address.

2. The replacement controlling method according to claim 1, further providing in the human-machine interface an updating rule table indicating which case is available when flag information is set or not for both the old and new terminal equipment, in the case that arrangement of the old and new terminal equipment is different each other and hardware addresses are not correspondent between the old and new terminal equipment; and updating a status of terminal equipment at the concerned management point in the first table, as referring the updating rule table.

3. The replacement controlling method according to claim 1, further indicating connection statuses of terminal equipment by setting flags in the tables; and when hardware addresses corresponding to managed points are necessarily switched, determining the connection statuses of terminal equipment, and setting a TEST mode by which only monitor controlling is enabled for the managed points and application processes are disable to monitor and control the managed points.

4. A building management system in which a human-machine interface and a processor are connected via a LAN, and a plurality of terminal equipment each having a management point within a building are connected to the pocessor, said building management system comprising:

a new processor;

new terminal equipment;

ole terminal equipment, which is to be replaced with the new terminal equipment; and a human-machine interface including a first table having information of hardward addresses of the old terminal equipment and the new terminal equipment, management points and statuses indicating whether the management points are connected to the old terminal equipment or the new terminal equipment;

the human-machine interface spreading out at an initial time the first table to a second table having information of correspondences between the hardware addresses of the old terminal equipment and a plurality of management points and flags indicating whether each of the old terminal equipment being used or not, and a third table having information of correspondences between the hardware addresses of the new terminal equipment and the plurality of management points and flags indicating whether each of the new terminal equipment being used or not, and downloading the second and third tables as management point information in the old terminal equipment and the new terminal equipment, respectively, wherein the old terminal equipment and the new terminal equipment inform the human-machine interface of status changes at management points according to the management point information, and the human-machine interface, further receives the status changes and displays a status change at a concerned hardware address so as to monitor the replacement of terminal equipment of the concerned hardware address.

5. The building management system according to claim 4, wherein the human-machine interface further includes an updating rule table indicating which case is available when flag information is set or not for both the old and new terminal equipment, in the case that arrangement of the old and new terminal equipment is different each other and hardware addresses are not correspondent between the old and new terminal equipment; and wherein the first table is updated with a status of terminal equipment at the converned management point, as referring the updating rule table.

6. The building management system according to claim 4, wherein the human-machine interface sets flags in the tables to indicate connection statuses of terminal equipment; and when hardware addresses corresponding to managed points are necessarily switched, determines the connection statuses of terminal equipment, and sets a TEST mode by which only monitor controlling is enabled for the managed points and application processes are disable to monitor and control the managed points.

\* \* \* \* \*